(12) United States Patent
Zhao et al.

(10) Patent No.: US 10,129,155 B2
(45) Date of Patent: Nov. 13, 2018

(54) DELAY BASED CONGESTION CONTROL PROTOCOL CO-EXISTING WITH TCP

(71) Applicant: Microsoft Technology Licensing, LLC, Redmond, WA (US)

(72) Inventors: Weidong Zhao, Bellevue, WA (US); Sanjeev Mehrotra, Redmond, WA (US); Jayashree Sadagopan, Bellevue, WA (US); Costin Hagiu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

(21) Appl. No.: 15/357,984

(22) Filed: Nov. 21, 2016

(65) Prior Publication Data

US 2018/0145914 A1 May 24, 2018

(51) Int. Cl.
*H04L 12/825* (2013.01)
*H04L 12/26* (2006.01)
*H04L 12/851* (2013.01)
*H04L 12/801* (2013.01)

(52) U.S. Cl.
CPC ........ *H04L 47/193* (2013.01); *H04L 43/0852* (2013.01); *H04L 43/0864* (2013.01); *H04L 43/16* (2013.01); *H04L 47/2483* (2013.01); *H04L 47/25* (2013.01)

(58) Field of Classification Search
None
See application file for complete search history.

(56) References Cited

U.S. PATENT DOCUMENTS

| 8,570,864 | B2 | 10/2013 | Li et al. |
| 9,088,510 | B2 | 7/2015 | Li et al. |
| 9,215,157 | B2 | 12/2015 | Qian et al. |
| 2002/0194361 | A1* | 12/2002 | Itoh ............... H04L 1/0002 709/233 |

(Continued)

FOREIGN PATENT DOCUMENTS

| CN | 102546436 A | 7/2012 |
| CN | 104113884 A | 10/2014 |

OTHER PUBLICATIONS

Fujikawa, et al., "A Hybrid TCP-Friendly Rate Control for Multimedia Streaming", In Proceedings of 2010 IEEE 18th International Packet Video Workshop, Dec. 13, 2010, pp. 134-141.

(Continued)

*Primary Examiner* — Faruk Hamza
*Assistant Examiner* — Cassandra L Decker
(74) *Attorney, Agent, or Firm* — Klarquist Sparkman, LLP

(57) ABSTRACT

Technologies are described for performing hybrid rate control that switches between a delay-based mode and a passive loss-based mode for a flow of network traffic. The switching can be performed based on the presence of loss-based TCP network flows. For example, rate control can be performed for a flow of network traffic in a delay-based mode. When the presence of a loss-based TCP network flow is detected, the flow of network traffic can be switched from the delay-based mode to a passive loss-based mode and rate control can be performed in the passive loss-based mode. When the loss-based TCP flow is no longer detected, the flow of network traffic can be switched back to the delay-based mode.

17 Claims, 6 Drawing Sheets

(56) References Cited

U.S. PATENT DOCUMENTS

| | | | | |
|---|---|---|---|---|
| 2010/0058147 | A1* | 3/2010 | Seferoglu | H04L 1/0009 714/776 |
| 2011/0026401 | A1* | 2/2011 | Wakuda | H04L 43/0894 370/235 |
| 2012/0063493 | A1* | 3/2012 | Hasegawa | H04L 47/263 375/211 |
| 2013/0322246 | A1* | 12/2013 | Zhou | H04L 47/11 370/235 |
| 2014/0269326 | A1* | 9/2014 | Westin | H04L 47/10 370/237 |
| 2014/0372623 | A1* | 12/2014 | Chen | H04L 47/30 709/231 |
| 2015/0350097 | A1* | 12/2015 | Osuga | H04L 43/0852 370/230 |
| 2016/0330123 | A1* | 11/2016 | Mena de la Cruz | H04L 47/12 |
| 2017/0331744 | A1 | 11/2017 | Mehrotra et al. | |
| 2018/0026898 | A1* | 1/2018 | Lee | H04L 47/27 |

OTHER PUBLICATIONS

Tan, et al., "CTCP: Improving TCP-Friendliness Over LowBuffered Network Links", In Proceedings of 6th International Workshop on Protocols for FAST Long-Distance Networks, Feb. 25, 2016, 8 pages.

Zhou, et al., "TFRC Veno: An Enhancement of TCP Friendly Rate Control over Wired/Wireless Networks", In Proceedings of IEEE International Conference on Network Protocols, Oct. 16, 2007, pp. 216-225.

Damjanovic, et al., "MulTFRC: Providing Weighted Fairness for Multimedia Applications (and others too!)", In Journal of ACM SIGCOMM Computer Communication Review, vol. 39, Number, Jul. 3, 2009, pp. 6-11.

Mehani, et al., "Adapting TFRC to Mobile Networks with Frequent Disconnections", In Proceedings of the 2008 ACM CoNEXT Conference, Dec. 9, 2008, 2 pages.

Huang, et al., "A novel congestion control mechanism on ffrc for streaming applications over wired-wireless networks", In Proceedings of the 6th ACM workshop on Wireless multimedia networking and computing, Oct. 31, 2011, pp. 9-16.

Kumar, et al., "A New Congestion Control Approach on TFRC Over Wired and Wireless Networks", In Journal of IOSR Journal of Computer Engineering, vol. 1, Issue 4, May 2012, pp. 1-8.

Kotla, Kiran, "Adapting a Delay-Based Protocol to Heterogeneous Environments", In Doctoral dissertation of Texas Aa&M University, Aug. 2008, 69 pages.

Leith, et al., "Delay-based AIMD congestion control", In Proceedings of Fifth International Workshop on Protocols for FAST Long-Distance Networks, Feb. 7, 2007, pp. 1-6.

Liu, et al., "TCP-Illinois: A Loss and Delay-Based Congestion Control Algorithm for High-Speed Networks", In Proceedings of the 1st International Conference on Performance Evaluation Methodologies and Tools, Oct. 11, 2006, 13 pages.

"TCP congestion control", Retrieved on: Sep. 20, 2016 Available at: https://en.wikipedia.org/wiki/TCP_congestion_control.

Rodriguez-Perez, et al., "Common Problems in Delay-Based Congestion Control Algorithms: A Gallery of Solutions", In Journal of European Transactions on Telecommunications, vol. 22, Issue 4, Jun. 2011, pp. 1-11.

Tang, et al., "Heterogeneous Congestion Control: Efficiency, Fairness and Design", In Proceedings of the 14th IEEE International Conference on Network Protocols, Nov. 12, 2006, pp. 127-136.

Budzisz, et al., "On the Fair Coexistence of Loss- and Delay-Based TCP", In Journal of IEEE/ACM Transactions on Networking, vol. 19, No. 6, Dec. 2011, pp. 1811-1824.

Padhye, et al., "Modeling TCP Reno Performance: A Simple Model and Its Empirical Validation", In Journal of IEEE/ACM Transactions on Networking, vol. 8, No. 2, Apr. 2000, pp. 133-145.

"Equation-Based Congestion Control for Unicast Applications", Retrieved on: Sep. 20, 2016 Available at: http://www.icir.org/tfrc/.

Xie, et al., "URCP: Universal Rate Control Protocol for Real-Time Communication Applications", In Technical Report MSR-TR-2013-64, Jun. 1, 2013, pp. 1-18.

* cited by examiner

DELAY BASED CONGESTION CONTROL PROTOCOL CO-EXISTING WITH TCP

BACKGROUND

Networks such as the Internet support a wide range of applications and corresponding network traffic flows. Different applications may have different requirements in terms of network throughput, delay, and loss. For example, interactive applications may require network traffic flows with low delay and low loss. In contrast, streaming applications may operate satisfactorily with relatively higher delay and loss, but may require high throughput.

In order to accommodate the different network traffic needs of these applications, different congestion control protocols have been developed. With loss-based protocols, bandwidth is increased until a loss event occurs, in which case the rate backs off. With delay-based protocols, the bandwidth is managed so that delay is low. While loss-based and delay-based protocols can operate efficiently in some networking environments, problems can occur when various network traffic flows are occurring at the same time. For example, loss-based flows can take over so that delay-based flows cannot compete fairly.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are provided for performing hybrid rate control operations for network communications. Hybrid rate control can be performed to switch between a delay-based mode and a passive loss-based mode for a flow of network traffic. The switching can be performed based on the presence of loss-based TCP network flows. For example, rate control can be performed for a flow of network traffic in a delay-based mode. When the presence of a loss-based TCP network flow is detected, the flow of network traffic can be switched from the delay-based mode to a passive loss-based mode and rate control can be performed in the passive loss-based mode. When the loss-based TCP flow is no longer detected, the flow of network traffic can be switched back to the delay-based mode.

DETAILED DESCRIPTION

Overview

Figure 1:
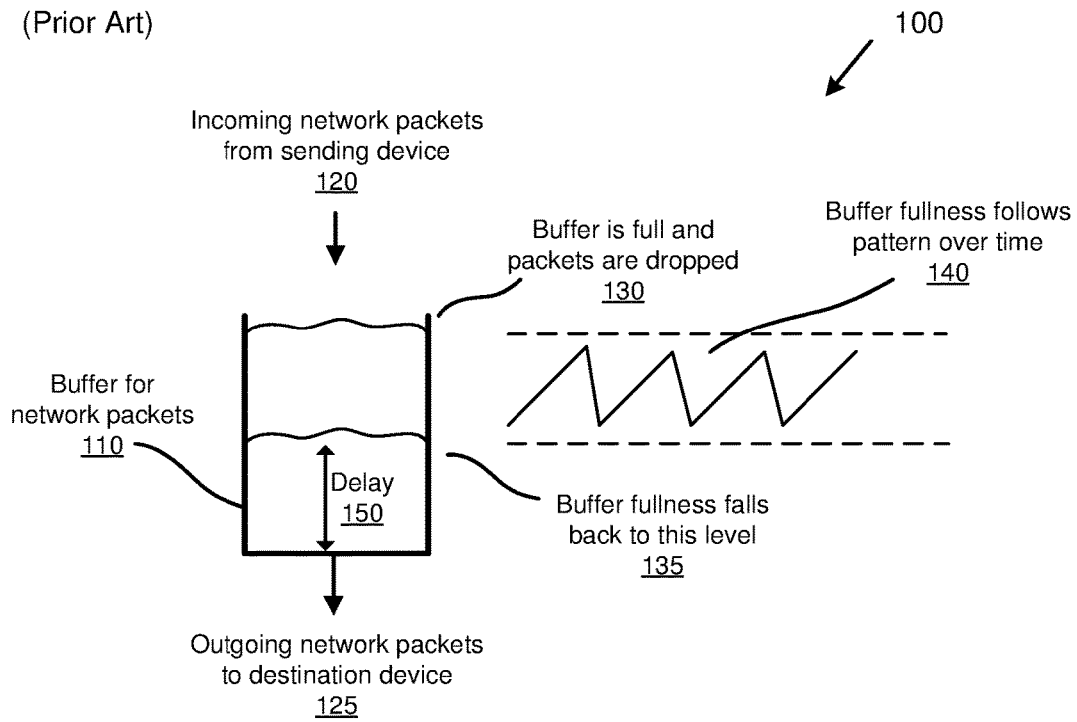
FIG. 1 is a diagram depicting example operation of loss-based and delay-based rate control protocols.
Figure 1:
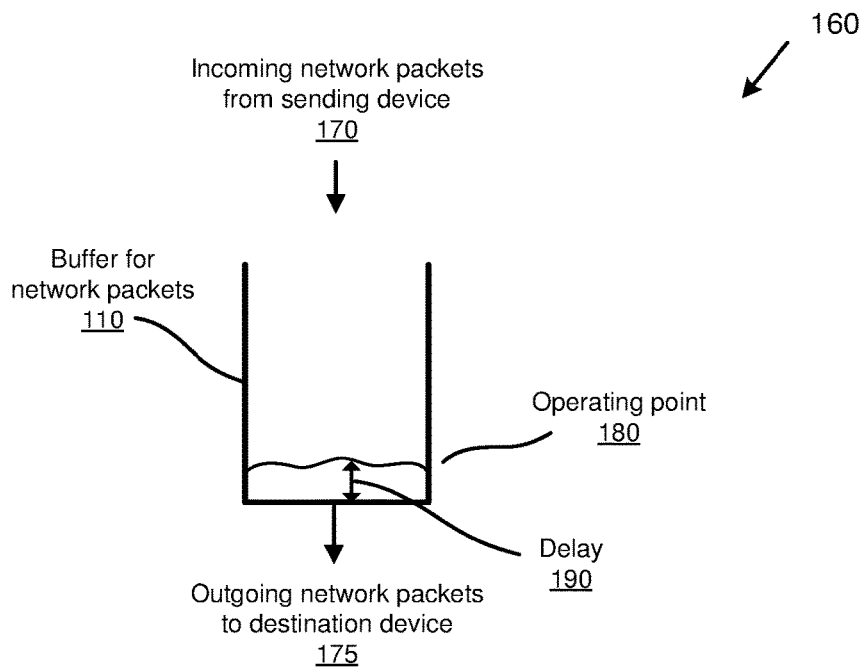

As described herein, various technologies are provided for supporting the co-existence delay-based and lost-based congestion control protocols. For example, hybrid rate control technology is provided that switches between a delay-based mode for performing rate control and a passive loss-based mode for performing rate control in order to more fairly compete with TCP network flows that use loss-based rate control.

Hybrid rate control can be performed to switch between a delay-based mode and a passive loss-based mode for performing rate control for a flow of network traffic. The switching can be performed based on the presence of loss-based TCP network flows. For example, rate control can be performed for a flow of network traffic in a delay-based mode. When the presence of a loss-based TCP network flow is detected, the flow of network traffic can be switched from the delay-based mode to a passive loss-based mode and rate control can be performed in the passive loss-based mode. When the loss-based TCP flow is no longer detected, the flow of network traffic can be switched back to the delay-based mode.

There are a wide range of heterogeneous network traffic flows over the Internet. Each application that sends traffic over the Internet has specific requirements in terms of throughput, delay, and loss. Based on these requirements, the application developer selects a congestion control protocol to use that has the best chance to achieve the performance goals and meet the requires in terms of throughput, delay, and loss.

There are two general classes of congestion control protocols used on the Internet. The first class are loss-based protocols. Loss-based protocols use the loss of network packets as the operational signal to perform loss-based rate control. For example, packet loss due to congestion of a packet buffer of a router can result in a signal to the sender to decrease its rate of sending packets (e.g., due to not receiving packet acknowledgements from the receiver or as a result of a response timeout). Examples of loss-based network protocols include TCP (Transmission Control Protocol) Tahoe, TCP Reno, TCP NewReno, TCP Cubic, H-TCP, TCP BIC (Binary Increase Congestion control), Compound TCP, and TFRC (TCP-Friendly Rate Control).

For loss-based protocols, TCP Reno is used as an example of how loss-based protocols operate. TCP Reno uses an Additive Increase Multiplicative Decrease (AIMD) algorithm for its steady state operation. This means that it increases the congestion window size linearly until it reaches a packet loss event, at which point it reduces the windows size by half. TCP Reno operates at near the congestion point, yielding almost full channel capacity in throughput but also typically having very high delay as well. This is true regardless of the presence of other competing network traffic, and is also true for other loss-based TCP variants because they also use the loss signal to perform rate control.

The second class of congestion control protocols are delay-based protocols. Delay-based protocols make use of queueing delay as the operational signal to perform delay-based rate control. In general, delay-based protocols try to maintain near equal flow of traffic into the buffer and out of the buffer and to maintain the buffer at a low level. This has the effect of reducing the delay while making almost full use of the channel Examples of delay-based network protocols include TCP Vegas, FAST TCP, and URCP (Universal Rate Control Protocol).

There are two general categories of applications that are based on their network requirements. The first is non real-time applications. For this category, performance is determined primarily by network throughput. With these applications, the delay between when a sender generates a packet to when the receiver consumes the packet is significantly longer than the network latency. Examples of this category of applications include file transfer applications (e.g., using file transfer protocol (FTP)), non-interactive web applications, and media streaming applications (e.g., video on demand). This category of applications typically utilizes loss-based protocols for network communications.

The second category of applications is real-time applications. For this category, performance is determined by throughput, delay, and loss. With these applications, the delay between when a sender generates a packet to when the receiver consumes the packet is on the order of the network latency. Therefore, network delay and loss is important for this category of applications. Examples of this category of applications include remote desktop applications, voice-over-IP (VoIP) applications, video conferencing applications, online gaming applications, and interactive cloud applications. This category of applications would operate effectively using delay-based protocols for network communications.

FIG. 1 is a diagram depicting example operation of loss-based and delay-based protocols. At 100, a simplified example of the operation of a loss-based protocol is illustrated (e.g., TCP Reno or another loss-based protocol). The operation of the loss-based protocol is illustrated in the context of a buffer 110 of a network router. The buffer 110 is a first-in first-out (FIFO) buffer that receives incoming network packets from a sending device 120 and sends outgoing network packets to a destination device 125. The loss-based protocol increases the rate of network packets until a loss event occurs, which in this example is due to the buffer 110 becoming full and dropping packets, as depicted at 130. As a result of the dropped packets (e.g., when acknowledgement packets are not received by the sending device), the sending device backs off (e.g., reduces the window size by half) which results in the buffer fullness backing off to a lower level, as depicted at 135. The sending device then starts increasing the rate again until loss event occurs and the process repeats. This repeating pattern of increasing rate and falling back is depicted by the pattern of buffer fullness over time 140, which is also called a saw-tooth pattern. In addition, due to the operation of the loss-based protocol, delay 150 is relatively high (e.g., in some implementations on the order of hundreds of milliseconds).

At 160, a simplified example of the operation of a delay-based protocol is illustrated. The operation of the delay-based protocol is illustrated in the context of the buffer 110 of a network router. The buffer 110 is receiving incoming network packets from a sending device 170 and sending outgoing network packets to a destination device 175. In contrast to the operation of the loss-based protocol (depicted at 100), the delay-based protocol tries to maintain an operating point 180 corresponding to low delay 190. For example, the sending device adjusts the rate of network packets so that the current delay is maintained at or near the operating point 180 (e.g., in some implementations on the order of tens of milliseconds).

As illustrated by FIG. 1, loss-based protocols and delay-based protocols operate predictably when they are the only network flow present. However, when both loss-based and delay-based network traffic flows are present through a given router (e.g., sharing the same buffer), problems can occur. Delay-based protocols typically operate at a much smaller delay than loss-based protocols when there is no competing traffic through the router. When there is competing traffic from a loss-based protocol, the delay is dictated by the loss-based protocol to a level near the congestion point (e.g., as depicted at 130), causing the delay-based protocol throughput to drop to a small portion of the overall channel capacity. This unfairness to the delay-based protocol in relation to the loss-based protocol is termed as lack of "TCP friendliness" or "TCP fairness", one of the major reasons why delay-based protocols have not seen wide spread use despite their advantages in situations that benefit from low delay.

A potential solution to this problem of TCP fairness involves adding a loss mode to a delay based protocol. Specifically, when a loss-based TCP flow (loss-based flows on the Internet are typically TCP based, but the technologies described herein apply to any loss-based flow) is present, the delay-based flow will switch to its loss mode which behaves like loss-based TCP in order to compete fairly. Implementing the potential solution involves detecting the presence of a loss-based TCP flow. Detecting when a loss-based TCP flow enters can be straightforward. However, it can be difficult to detect when the loss-based TCP flow stops while there are other delay-based flows still present and operating in the loss mode.

In the technologies described herein, a new delay-based protocol is provided. The new delay-based protocol operates in some situations like a loss-based TCP protocol in terms of throughput and is therefore able to compete fairly when there are loss-based TCP flows present. However, the new delay-based protocol has a built-in slight downward pressure to drive its delay down so that when there are no loss-based TCP flows, its delay will fall back toward zero to allow for switching to a delay-based mode automatically. The new delay-based protocol takes advantage of the operation of loss-based TCP protocols which all induce loss events in an active fashion. Therefore, by removing the active loss functioning of an equation based TCP protocol, loss events can be eliminated if no loss-based TCP flows are present. When this happens, the loss rate goes down and delay is reduced automatically.

Actively Induced Loss

Loss-based TCP flows actively induce loss due to their operation. Specifically, loss-based TCP flows (also called active loss-based TCP flows) use packet loss events to control the transmission rate. In order to use loss events, active-based TCP protocols actively cause loss events by driving the transmission rate up until a loss event happens.

Using TCP Reno as an example of a loss-based TCP protocol, consider its congestion window W which operates in a saw-tooth pattern due to the AIMD algorithm (e.g., as depicted at 140). The following two equations define the operation of the congestion window.

$$W \rightarrow W + (1/W) \text{ for each ACK received} \qquad \text{(Equation 1)}$$

$$W \rightarrow W/2 \text{ for each NACK received} \qquad \text{(Equation 2)}$$

According to Equation 1, while there is no loss W will keep increasing regardless of other network traffic flows, until the total bytes-in-flight in the buffer exceeds the buffer size of the router and packets are dropped. In other words, the loss-based algorithm itself will drive the loss to happen regardless of whether other flows are currently traversing the router. This type of operation, in which the protocol increases the packet rate to cause a loss event regardless of other flows, is called actively induced loss. All loss-based TCP variants (not just TCP Reno) actively induce loss due to their operation because they need to generate a loss event to operate.

TCP-Friendly Rate Control

TCP-Friendly Rate Control (TFRC) is an equation-based TCP protocol where the rate is driven by the following throughput equation.

$$BW = \frac{mtu}{rtt * f(\varepsilon)} \qquad \text{(Equation 3)}$$

In Equation 3, rtt is the round-trip time, BW is the transmission rate, mtu is the packet size, and ε is the loss rate defined by the following equation.

$$f(\varepsilon) = \sqrt{\frac{3}{2}\varepsilon} + 12\sqrt{\frac{3}{2}\varepsilon} * \varepsilon(1 + 32\varepsilon^2) \qquad \text{(Equation 4)}$$

The transmission rate calculated by Equation 3 is updated according to Equation 4 at each rtt interval. Equations 3 and 4 are simplified versions of the full TFRC equations in which the receiver side update at rtt is not performed and no smoothing is performed to the loss rate computation. As there is no smoothing for the loss rate, the function $f(\varepsilon)$ operates as a step changing function in time, as the loss rate ε essentially gets updated for each new loss event received. In other words, the short-term behavior of the rate is primarily determined by the variation of rtt due to the inverse of rtt in Equation 3 until the next loss event occurs to update $f(\varepsilon)$.

TFRC was designed as a TCP friendly protocol for multimedia applications requiring a smoother rate than TCP Reno. As an equation based flow, TFRC exhibits a pattern without the spikes that are present with TCP Reno (e.g., as depicted at 140). Even though TFRC has a smoother pattern, TFRC still actively induces loss. To illustrate how TFRC actively induces loss, assume that BW is below the channel capacity, and there are no other flows through the router that will drive the buffer to the congestion point. Loss will still happen as rtt starts to drop down, and based on Equation 3 BW will keep increasing beyond the channel capacity, eventually leading to loss and updating $f(\varepsilon)$ as a result.

Hybrid Rate Control Protocol

In the technologies described herein, a new delay-based protocol, described herein as a hybrid rate control protocol, is provided. The hybrid rate control protocol operates as a delay-based protocol but switches to a passive loss-based mode when other loss-based flows are detected. In addition, the hybrid rate control protocol switches back to a delay-based mode when the other loss-based flows stop.

The hybrid rate control protocol operates similarly to TFRC, but with a significant difference. Specifically, Equation 3 is modified so that it no longer actively induces loss. This is accomplished by setting an upper bound on the short-term behavior of the rate in Equation 3. In some implementations, the upper bound is set to the minimum of the current transmission rate calculation and the transmission rate calculated at the last loss event. The upper bound is then updated every time a new loss event is registered. The hybrid rate control protocol uses the following equation to calculate the transmission rate, where $BW_{lastLoss}$ is the transmission rate computed at the last loss event.

$$\text{Final } BW = \min(BW, BW_{lastLoss}) \qquad \text{(Equation 5)}$$

In some implementations, the upper bound is set using another technique. For example, a number of pervious loss events can be averaged to calculate the upper bound (e.g., the average transmission rate for the last two, or more, loss events) instead of just using the last loss event.

Due to Equation 5, the hybrid rate control protocol will not actively induce a loss. Because the hybrid rate control protocol cannot actively cause a loss event while in loss-based mode, its loss-based mode is called a passive loss-based mode. To illustrate that Equation 5 results in loss no longer being active, consider the case of a single flow with no other flows in the router. Due to Equation 5, the transmission rate cannot be greater than at the last loss event (corresponding to the channel capacity). Because the transmission rate can only decrease from there, there can be no active loss event. In contrast, the original TFRC protocol can cause the transmission rate to increase until a new loss event takes place.

In addition, the hybrid rate control protocol operates differently from TCP. For example, the hybrid rate control protocol is less aggressive than TCP because the hybrid rate control protocol will not actively induce a loss. In addition, the hybrid rate control protocol reacts slower than TCP in performing transmission rate changes when there are no active loss events occurring, which gives time for the network delay to decrease (e.g., the rtt time to drop below a threshold value) for switching back to the delay-based mode. These attributes of the hybrid rate control protocol allow the hybrid rate control protocol to switch back to the delay-based mode in the absence of loss-based TCP flows.

Figure 2:
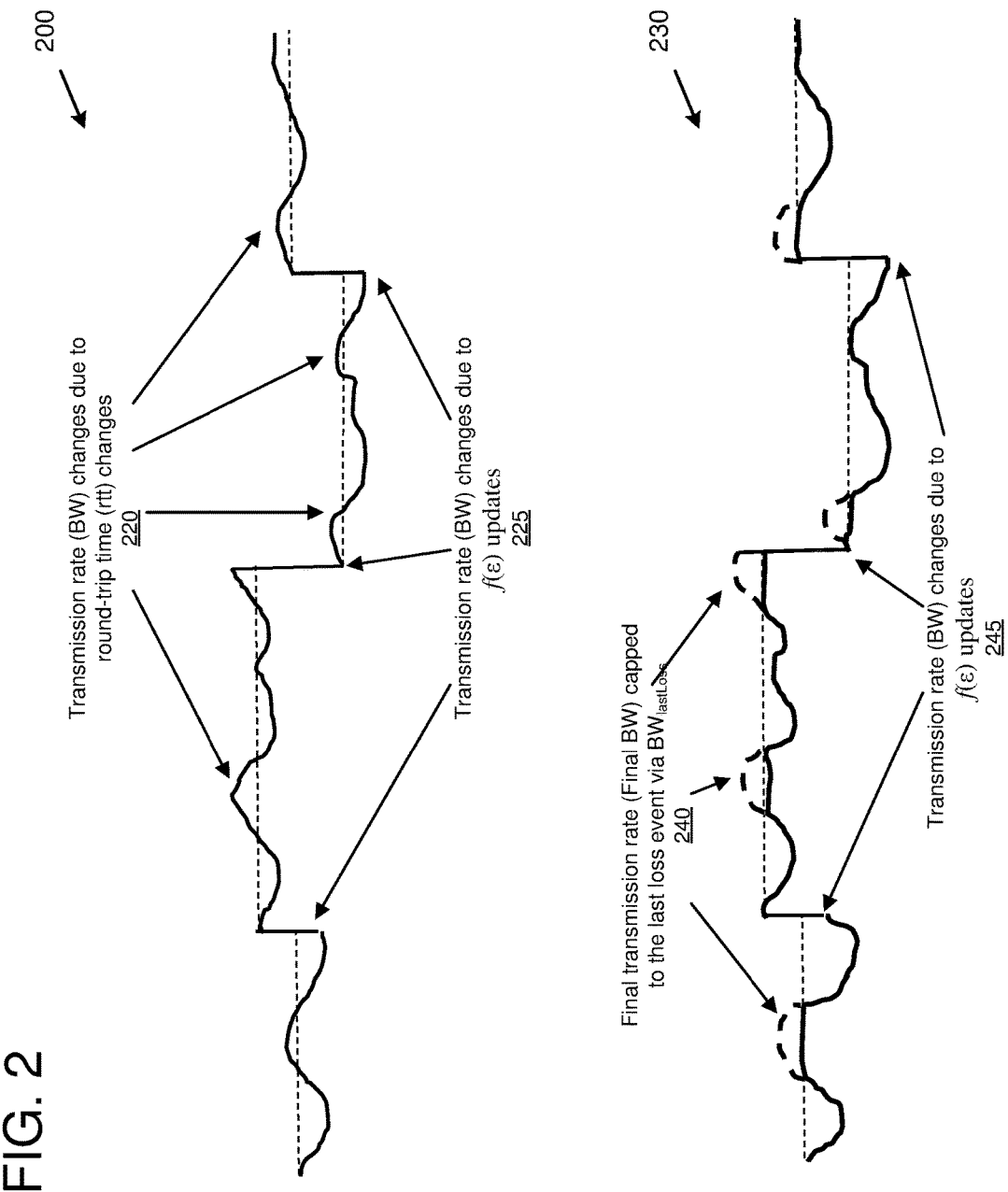
FIG. 2 is a diagram of example graphs depicting changes in transmission rate according to rate control algorithms.

FIG. 2 is a diagram of example graphs depicting changes in transmission rate illustrating operation of the hybrid rate control algorithm. At 200, a first graph is depicted. The first graph displays transmission rate (BW) changes over time according to the TFRC protocol. As depicted at 225, there are three locations where the transmission rate changes due to an update to $f(\varepsilon)$, which happens when a loss event is detected causing a step-up or step-down to the transmission rate. Between the loss events, the transmission rate changes due to changes in the round-trip time, as depicted at 220. Significantly, some of the changes in transmission rate operate to move the transmission rate above the initial rate of the last step up (four of these points are indicated by the arrows from 220), which illustrate how TFRC can actively induce a loss event.

At 230, a second graph is depicted. The second graph displays final transmission rate (Final BW) changes over time according to the hybrid rate control protocol. As depicted at 245, there are three locations where the transmission rate changes due to an update to $f(\varepsilon)$, which happens when a loss event is detected causing a step-up or step-down to the transmission rate. Between the loss events, the transmission rate changes due to changes in the round-trip time, as depicted at 240. However, unlike with the TFRC graph depicted at 200, the transmission rate is capped so that it will not rise above the transmission rate of the last loss event. This is depicted at 240, where the solid line (Final BW) does not go above the initial transmission rate of the last loss event. In other words, the hybrid rate control protocol operates to prevent the dashed line humps (which could have caused a loss event), three of which are pointed to by the arrows from 240).

One problem that can occur with a delay-based protocol that switches to a loss-based mode is detecting when to switch back to the delay-based mode. For example, if there are two or more delay-based protocol flows going through a router, and both are operating in the loss-based mode (e.g., due to a previous loss-based TCP flow that has now stopped), each may think the other is a loss-based TCP flow and thus never switch back to delay-based mode.

In order to solve this problem, hybrid rate control protocol does not actively induce loss. This means that the hybrid rate control protocol will not actively create a loss event, and a loss event can only be created if there is a loss-based protocol that drives the rate up to at or near the congestion point so that the loss-based protocol (and other protocols sharing the same buffer) experience a loss event. Therefore, due to operation of Equation 5 (in combination with Equation 3), the hybrid rate control protocol will decrease its transmission rate in the absence of any flows that actively induce loss. This will be the case regardless of how many hybrid rate control flows are present, as none of them will actively induce a loss event if there are no active loss flows present. While the hybrid rate control protocol does not active induce loss, the hybrid rate control protocol can still experience a loss event if another loss-based protocol drives the buffer up to the point of causing dropped packets.

The hybrid rate control protocol competes fairly with loss-based TCP flows, such as TCP Reno. When a TCP Reno flow is present, it drives the router buffer to the congestion point via its AIMD algorithm. At the congestion point all flows sharing the buffer experience packet drops regardless of which flow causes the loss. Due to the loss event, the hybrid rate control protocol will operate in loss mode and adjust its rate according to Equation 5. When the last TCP Reno flow (or other loss-based TCP flow) departs, the net rate present in the router is approximately the channel capacity minus the TCP Reno rate that just departed, which is substantially below the channel capacity. Since the continuing hybrid rate control flow or flows cannot be higher than the rate registered at the last loss event, this net deficiency to the channel will continue going forward. As a result, the router buffer will decrease quickly, leading to a corresponding decrease in delay and resulting in a switch for the hybrid rate control flow back to a delay-based mode.

In some implementations, the hybrid rate control operation switches between a passive loss-based mode and a delay-based mode based upon the network delay (e.g., one-way latency, round-trip time (rtt), and/or another measure of network delay). For example, when the network delay increases (e.g., round-trip time increases above a threshold value), the hybrid rate control protocol switches to a passive loss-based mode in order to compete with other active loss-based flows (e.g., loss-based TCP network flows or other loss-based flows that actively cause loss events) that are present (the high delay or high round-trip time indicates that there are other active loss-based flows present). While in the loss-based mode, the hybrid rate control protocol operates in a passive loss-based mode in which the hybrid rate control protocol does not actively induce a loss event. In the passive loss-based mode, a flow operating according to the hybrid rate control protocol may still experience a loss event, but the loss event will be caused by another loss-based flow that actively induces the loss (and not by the flow in the passive loss-based mode). When the network delay decreases (e.g., round-trip time decreases below a threshold value), the hybrid rate control protocol switches to a delay-based mode (the low network delay or round-trip time indicates that the active loss-based flows are no longer present). Switching back to the delay-based mode can also be based on the absence of loss events (e.g., in addition to observing a decrease in the delay).

In some implementations, different types of changes in network delay can result in switching between the passive loss-based mode and the delay-based mode. A first type of change in network delay is a significant increase in delay (e.g., which results in a significant decrease in the rate). A significant increase in delay can be a specific value, a percentage, or multiple of a current delay (e.g., a 15 ms delay that increases ten times to 150 ms). For example, a threshold value for changing from the delay-based mode to the passive loss-based mode can be a specific value, a percentage, or multiplier value relative to a current delay (e.g., if the delay increases to over 20 times its current value or to 500 ms, then switch). A second type of change in network delay is a rapid increase in delay (e.g., which results in a rapid decrease in the rate). A rapid increase can be represented as an increase amount (e.g., percentage or multiple of a current delay) over a period of time. For example, a rapid increase in the delay can indicate that a loss-based TCP flow has started, while a slower increase in the delay can indicate that a number of delay-based flows have started (but not a loss-based TCP flow). In some implementations, significance of the delay can be used in combination with how rapidly the delay increases. For example, if a delay increases to over 150 ms in less than a second, it could be determined to be caused by a loss-based flow (e.g., initiating a switch to a passive loss-based mode). However, if the delay increases to over 150 ms in more than a second, it could be determined to be caused by other delay-based flows (e.g., not initiating the switch). Similarly, switching back from the passive loss-based mode to the delay-based mode can be based on a significant decrease in delay and/or how rapidly the delay is decreasing.

Example Methods for Performing Hybrid Rate Control

In the technologies described herein, methods can be provided for performing hybrid rate control operations for network communications. For example, rate control for a flow of network traffic can be switched between a delay-based mode and a passive loss-based mode. The switching can be performed based on the presence of loss-based TCP network flows that actively cause loss events (also called active loss-based TCP network flows).

Figure 3:
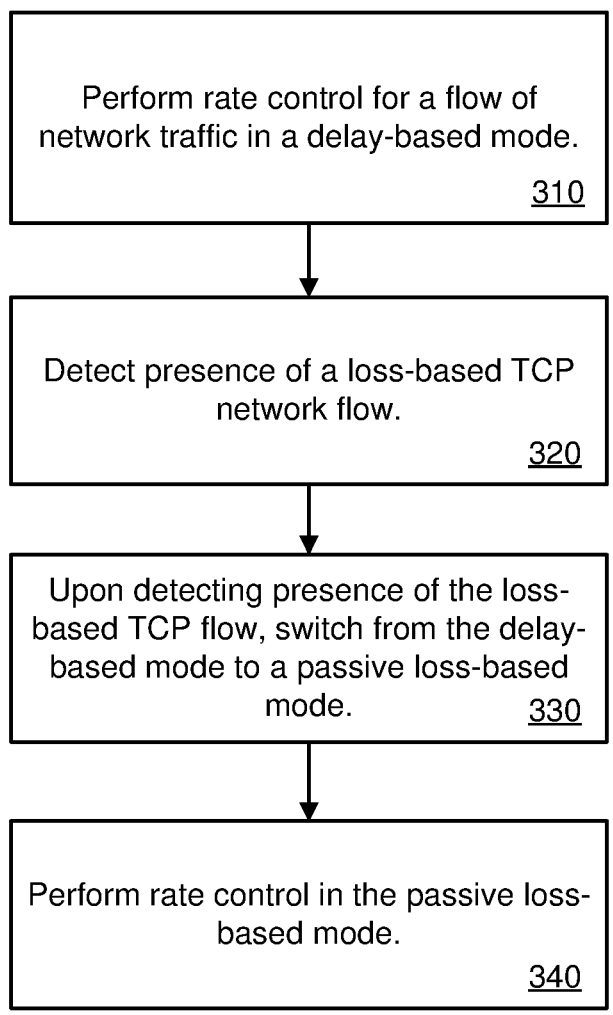
FIG. 3 is a diagram depicting an example method for performing hybrid rate control operations for network communications.

FIG. 3 is a flowchart of an example method 300 for performing hybrid rate control operations for network communications. At 310, rate control for a flow of network traffic is performed in a delay-based mode. The flow of network traffic occurs between a first computing device and a second computing device. For example, the flow of network traffic can carry network packets supporting a streaming audio-video connection or a remote desktop application. The hybrid rate control operations can be performed according to a hybrid rate control protocol, such as a modified TFRC protocol (e.g., modified according to Equation 5).

At 320, the presence of a loss-based TCP network flow is detected. The loss-based TCP network flow actively causes loss events. The loss-based TCP network flow can be detected based on an increase in network delay for the flow of network traffic in the delay-based mode. For example, the presence of the loss-based TCP network flow can be detected when the round-trip time for the flow of network traffic increases above a threshold value (e.g., a threshold number of milliseconds).

At 330, upon detecting the presence of the loss-based TCP network flow, the delay-based mode is switched to a passive loss-based mode for the flow of network traffic. The passive loss-based mode does not actively induce a loss event. For example, an upper bound can be set for the transmission rate for the flow of network traffic. The upper bound can be set to the transmission rate calculated at the last loss event. In some implementations, a final transmission rate is calculated for the flow of network packets to be a minimum of a current transmission rate and the transmission rate calculated at the last loss event.

At 340, rate control is performed in the passive loss-based mode while the loss-based TCP network flow is present. Operating in the passive loss-based mode allows the flow of network traffic to compete more fairly with the loss-based TCP network flow. The passive loss-based mode is maintained while the loss-based TCP network flow is present, and when the loss-based TCP network flow stops (and there are no other loss-based TCP flows present), then the flow of network traffic switches back to the delay-based mode. For example, the switch can occur upon detecting a decrease in network delay for the flow of network traffic. In some implementations, the decrease in network delay is detected when the round-trip time for the flow of network traffic falls below a threshold value (e.g., a threshold number of milliseconds).

Figure 4:
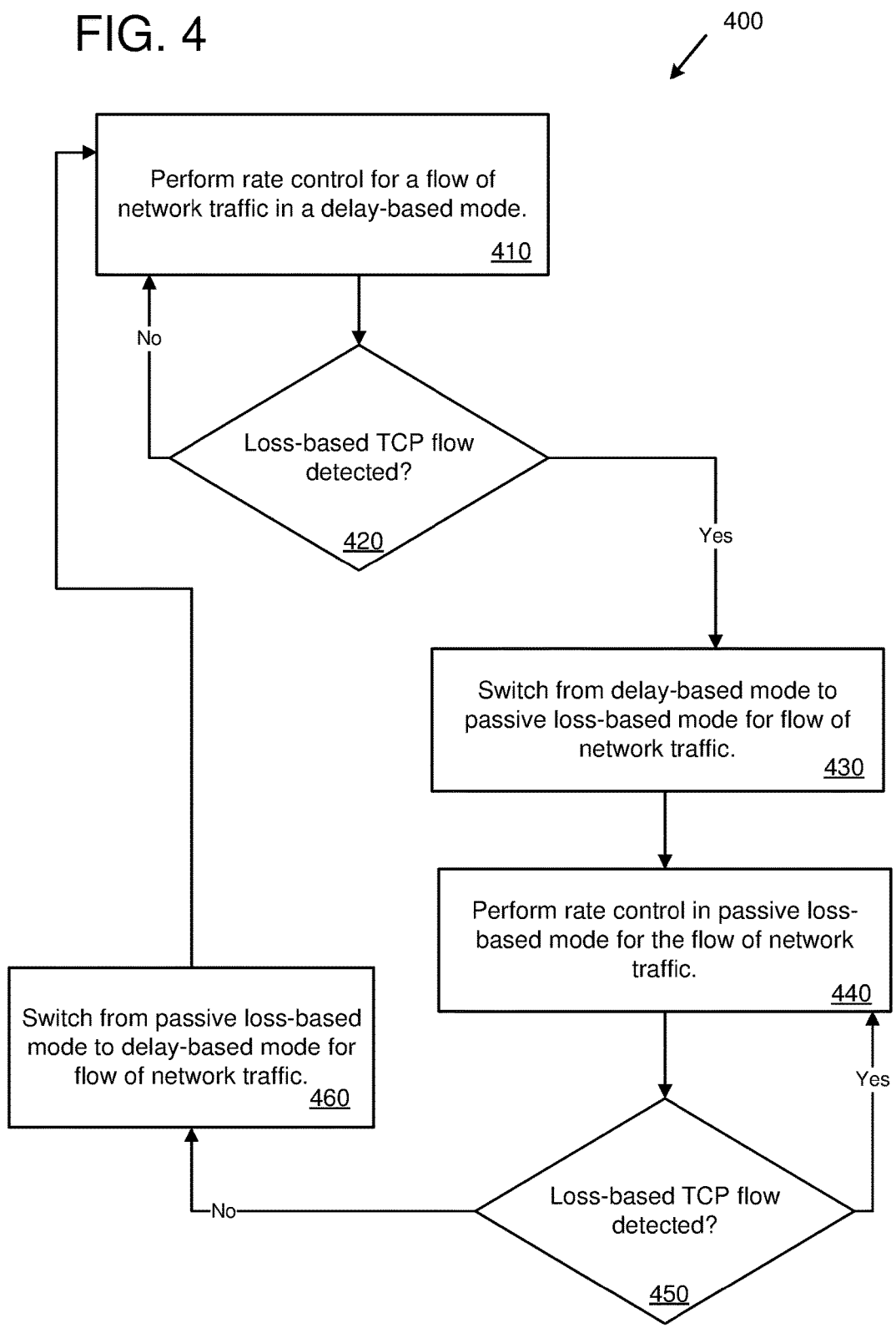
FIG. 4 is a diagram depicting an example flowchart for switching between a delay-based mode and a passive loss-based mode for performing hybrid rate control.

FIG. 4 is a diagram depicting an example flowchart 400 for performing a hybrid rate control algorithm for switching between a delay-based mode and a passive loss-based mode. At 410, rate control is performed for a flow of network traffic in a delay-based mode. During operation in the delay-based mode, the presence of loss-based TCP flows is detected, as depicted at 420. If a loss-based TCP flow is not detected (e.g., based on network delay, such as round-trip time), then rate control continues at 410 in the delay-based mode.

However, if a loss-based TCP flow is detected, then the algorithm proceeds to 430 where the flow of network traffic is switched from the delay-based mode to a passive loss-based mode. At 440, rate control is performed in the passive loss-based mode for the flow of network traffic. During operation in the passive loss-based mode, the presence of loss-based TCP flows is detected, as depicted at 450. If loss-based TCP flows are detected (e.g., based on network delay, such as round-trip time), then the rate control continues at 440 in the passive loss-based mode. However, if no loss-based TCP flows are detected, then the algorithm proceeds to 460 where the flow of network traffic is switched from the passive loss-based mode to the delay-based mode, and rate control is performed in the delay-based mode at 410.

Figure 5:
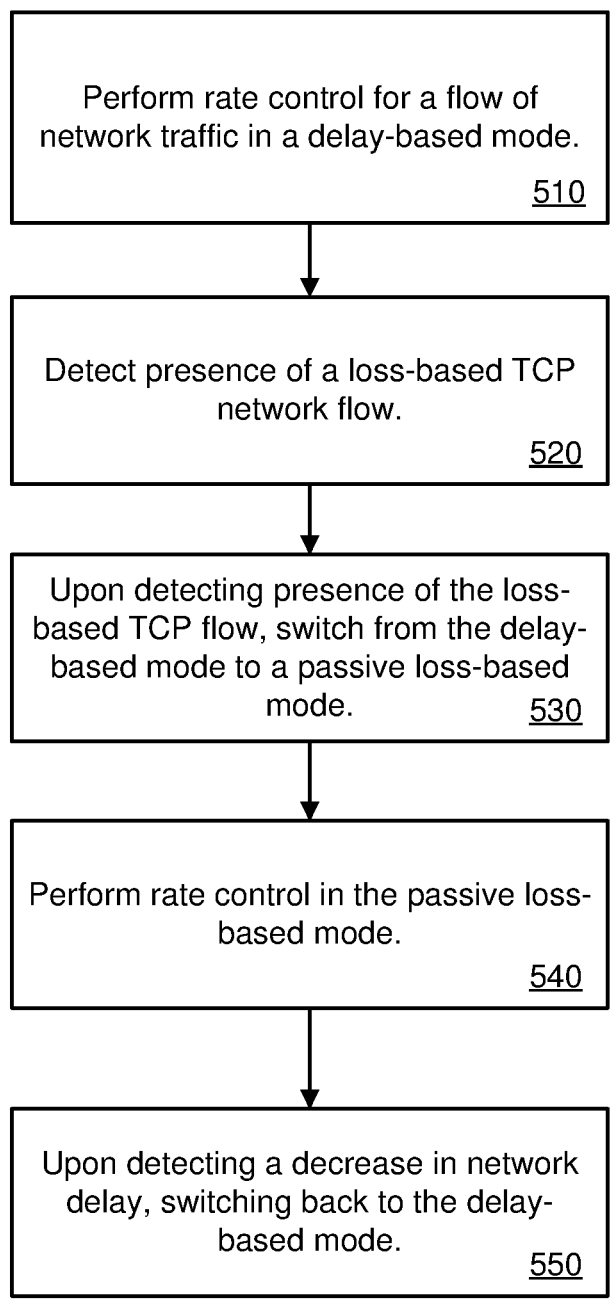
FIG. 5 is a diagram depicting an example method for performing hybrid rate control operations for network communications.

FIG. 5 is a flowchart of an example method 500 for performing hybrid rate control operations for network communications, including switching between a delay mode and a passive loss-based mode. At 510, rate control for a flow of network traffic is performed in a delay-based mode. The flow of network traffic occurs between a first computing device and a second computing device. For example, the flow of network traffic can carry network packets supporting a streaming audio-video connection or a remote desktop application. The hybrid rate control operations can be performed according to a hybrid rate control protocol, such as a modified TFRC protocol (e.g., modified according to Equation 5).

At 520, the presence of a loss-based TCP network flow is detected. The loss-based TCP network flow actively causes loss events. The loss-based TCP network flow can be detected based on an increase in network delay for the flow of network traffic in the delay-based mode. For example, the presence of the loss-based TCP network flow can be detected when the round-trip time for the flow of network traffic increases above a threshold value (e.g., a threshold number of milliseconds).

At 530, upon detecting the presence of the loss-based TCP network flow, the delay-based mode is switched to a passive loss-based mode for the flow of network traffic. The passive loss-based mode does not actively induce a loss event. For example, an upper bound can be set for the transmission rate for the flow of network traffic. The upper bound can be set to the transmission rate calculated at the last loss event. In some implementations, a final transmission rate is calculated for the flow of network packets to be a minimum of a current transmission rate and the transmission rate calculated at the last loss event.

At 540, rate control is performed in the passive loss-based mode while the loss-based TCP network flow is present. Operating in the passive loss-based mode allows the flow of network traffic to compete more fairly with the loss-based TCP network flow. The passive loss-based mode is maintained while the loss-based TCP network flow is present, and when the loss-based TCP network flow stops (and there are no other loss-based TCP flows present), then the flow of network traffic switches back to the delay-based mode.

At 550, upon detecting a decrease in network delay, the flow of network traffic is switched back to the delay-based mode from the passive loss-based mode. In some implementations, the decrease in network delay is detected when the round-trip time for the flow of network traffic falls below a threshold value (e.g., a threshold number of milliseconds).

Computing Systems

Figure 6:
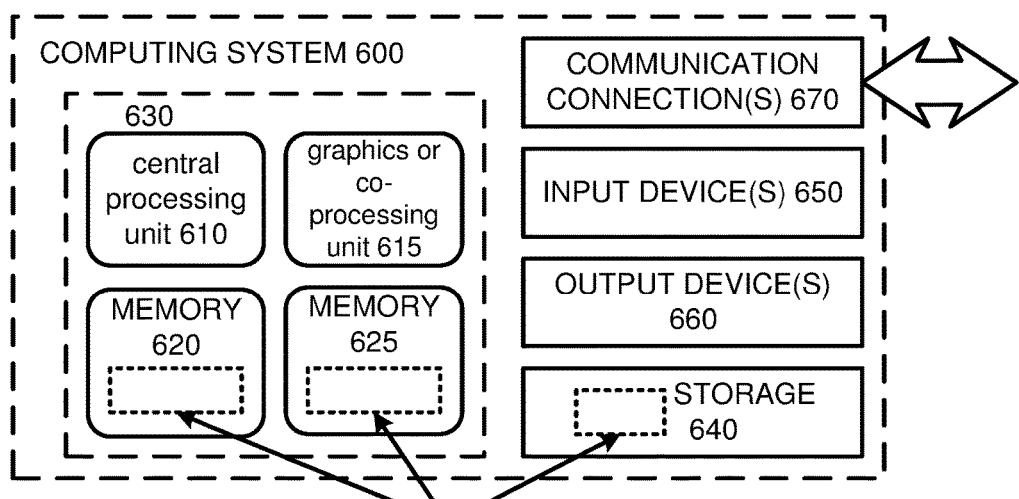
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections, such as 670.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
a processing unit;
memory; and
a network interface;
the processing unit executing computer instructions performing hybrid rate control operations for network communications, the operations comprising:
performing rate control for a flow of network traffic in a delay-based mode, wherein the flow of network traffic is between the computing device and a remote computing device;
detecting presence of a loss-based transmission control protocol (TCP) network flow;
upon detecting the presence of the loss-based TCP network flow:
switching from the delay-based mode to a passive loss-based mode for the flow of network traffic, wherein the passive loss-based mode does not actively induce a loss event; and
performing rate control for the flow of network traffic in the passive loss-based mode;
wherein performing rate control for the flow of network traffic in the passive loss-based mode comprises calculating a final transmission rate for the flow of network traffic to be a minimum of a current transmission rate and a transmission rate calculated at a last loss event.

2. The computing device of claim 1, the operations further comprising:
while performing rate control in the passive loss-based mode:
upon detecting a decrease in network delay for the flow of network traffic, switching back to the delay-based mode for the flow of network traffic.

3. The computing device of claim 1, the operations further comprising:
while performing rate control in the passive loss-based mode:
upon detecting that a round-trip time for the flow of network traffic falls below a threshold value, switching back to the delay-based mode for the flow of network traffic.

4. The computing device of claim 1 wherein detecting the presence of the loss-based TCP network flow comprises:
detecting an increase in network delay for the flow of network traffic in the delay-based mode.

5. The computing device of claim 1 wherein detecting the presence of the loss-based TCP network flow comprises:
determining that a round-trip time for the flow of network traffic in the delay-based mode increases above a threshold value.

6. The computing device of claim 1, wherein performing rate control for the flow of network traffic in the passive loss-based mode comprises:
setting an upper bound for transmission rate for the flow of network traffic, wherein the upper bound is set to the calculated final transmission rate.

7. A method, implemented by a computing device, for hybrid rate control for network communications, the method comprising:
performing rate control for a flow of network traffic in a delay-based mode, wherein the flow of network traffic is between the computing device and a remote computing device;
detecting presence of a loss-based transmission control protocol (TCP) network flow;
upon detecting the presence of the loss-based TCP network flow:
switching from the delay-based mode to a passive loss-based mode for the flow of network traffic, wherein the passive loss-based mode does not actively induce a loss event; and
performing rate control for the flow of network traffic in the passive loss-based mode;
wherein performing rate control for the flow of network traffic in the passive loss-based mode comprises calculating a final transmission rate for the flow of network traffic to be a minimum of a current transmission rate and a transmission rate calculated at a last loss event.

8. The method of claim 7, further comprising:
while performing rate control in the passive loss-based mode:
upon detecting a decrease in network delay for the flow of network traffic, switching back to the delay-based mode for the flow of network traffic.

9. The method of claim 7, further comprising:
while performing rate control in the passive loss-based mode:
upon detecting that a round-trip time for the flow of network traffic falls below a threshold value, switching back to the delay-based mode for the flow of network traffic.

10. The method of claim 7 wherein detecting the presence of the loss-based TCP network flow comprises:
detecting an increase in network delay for the flow of network traffic in the delay-based mode.

11. The method of claim 7 wherein detecting the presence of the loss-based TCP network flow comprises:
determining that a round-trip time for the flow of network traffic in the delay-based mode increases above a threshold value.

12. The method of claim 7 wherein performing rate control for the flow of network traffic in the passive loss-based mode comprises:
setting an upper bound for transmission rate for the flow of network traffic, wherein the upper bound is set to the calculated final transmission rate.

13. A computer-readable storage medium storing computer-executable instructions for causing a computing device to perform hybrid rate control operations for network communications, the operations comprising:
performing rate control for a flow of network traffic in a delay-based mode, wherein the flow of network traffic is between the computing device and a remote computing device;

detecting presence of a loss-based transmission control protocol (TCP) network flow, wherein the loss-based TCP network flow actively causes loss events;

upon detecting the presence of the loss-based TCP network flow:

switching from the delay-based mode to a passive loss-based mode for the flow of network traffic, wherein the passive loss-based mode does not actively induce a loss event;

performing rate control for the flow of network traffic in the passive loss-based mode;

wherein performing rate control for the flow of network traffic in the passive loss-based mode comprises calculating a final transmission rate for the flow of network traffic to be a minimum of a current transmission rate and a transmission rate calculated at a last loss event; and upon detecting a decrease in network delay for the flow of network traffic, switching back to the delay-based mode for the flow of network traffic, wherein the decrease in network delay indicates that the loss-based TCP network flow has stopped.

14. The computer-readable storage medium of claim 13 wherein detecting the decrease in network delay for the flow of network traffic comprises:

detecting that a round-trip time for the flow of network traffic falls below a threshold value.

15. The computer-readable storage medium of claim 13 wherein detecting the presence of the loss-based TCP network flow comprises:

detecting an increase in network delay for the flow of network traffic in the delay-based mode.

16. The computer-readable storage medium of claim 13 wherein detecting the presence of the loss-based TCP network flow comprises:

determining that a round-trip time for the flow of network traffic in the delay-based mode increases above a threshold value.

17. The computer-readable storage medium of claim 13 wherein performing rate control for the flow of network traffic in the passive loss-based mode comprises:

setting an upper bound for transmission rate for the flow of network traffic, wherein the upper bound is set to the calculated final transmission rate.

* * * * *